Patented Apr. 15, 1952

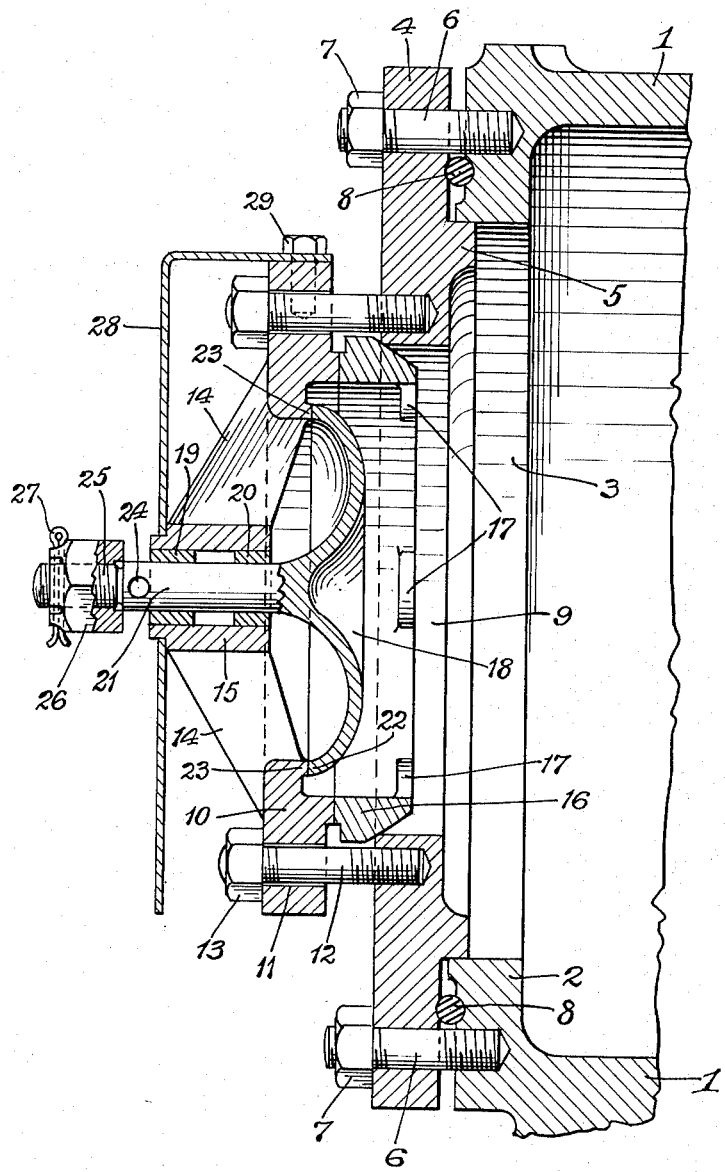

2,593,376

UNITED STATES PATENT OFFICE 2,593,376

AIR VALVE

Paul Willis, Blue Island, Ill.

Application April 1, 1946, Serial No. 658,653

3 Claims. (Cl. 251—127)

This invention relates to an air valve and it has for one object to provide means in connection with a locomotive valve chest for permitting air at volume capacity to enter the chest.

Another object is to provide vacuum breaking means for use with steam engines generally.

A further object is to provide means in connection with the cylinders of a steam engine for displacing any vacuum which may be formed when the engine is drifting with the throttle closed.

Other objects will appear from time to time throughout the specification and claims.

Although the invention is illustrated in connection with a conventional locomotive valve chest, it is not limited to that association and may be used in other associations.

The invention is illustrated in the accompanying drawing, which is a part section through a portion of a locomotive valve chest with the air valve of the invention shown.

1 is a portion of the valve chest housing which is provided with an internal flange 2 which is positioned about and defines an opening 3. A closure plate 4 is provided with an internal annular flange 5 which fits within the opening 3. The closure plate 4 is removably held in place by threaded studs 6 which engage the member 1, pass through suitable perforations in the member 4 and receive nuts 7. Packing means 8 may be positioned between the member 4 and the adjacent surface of the member 1 or the flange 2, to provide adequate sealing.

The plate or member 4 is provided with an opening 9 in which the valve of the present invention is seated. The valve assembly includes a main housing member 10 which is perforated, as at 11, to receive studs 12. The studs as shown are engaged in the member 4 and are threaded to receive holding nuts 13. One or more arms 14 are preferably integral with the member 10 and converge inwardly and engage or are integral with a bearing supporting member 15. A ball ring 16 is positioned in engagement with the member 4 and may penetrate partly into the opening 9. The ball ring 16 is also in engagement with the member 10 and is provided with one or more interiorly directed lugs or projections 17.

A valve member 18 is positioned for movement within the bearing housing 15. A pair of separated bushings 19, 20 supports the valve stem 21 for sliding movement. The valve is formed as shown with a peripheral seating portion 22 which seats against a seat member or portion 23 formed in the housing body 10. The valve stem 21 is perforated, as at 24, and may be reduced and threaded, as at 25. A castellated nut 26 is received upon the threaded portion 25, where it is fixed in adjusted position by a cotter pin 27. The nut is shaped to overhang the valve stem 21 when in suitable adjusted position. A shield 28 of sufficient size to cover the valve and valve opening is mounted on the body 10 and held in place by one or more screws 29.

The device may be assembled upon or attached to a conventional valve chest. Ordinarily such valve chests are provided with closure plates which keep closed the opening 3. To mount the valve in such an assembly the closure plate is removed and is bored or otherwise shaped to provide the opening 9 in register with which the valve is to be positioned.

The valve is assembled by putting the stem 21 into the bushings 19, 20. The ball ring 16 is then put in place and the valve assembly is fastened to the member 4 by the studs 12. The nut 26 is then adjusted to the suitable position on the threaded portion 25 of the stem 21 and is locked in place by the cotter pin 27 or otherwise. The opening 24 may be engaged by a tool which holds the stem against rotation when the nut is screwed into desired position. Obviously other means for holding the stem against rotation might be used.

The adjustment of the nut 26 determines the possible sliding movement of the valve stem. Obviously the stem can move inwardly only until the nut 26 strikes the outer or exposed end of the bearing support 15.

The lugs or projections 17 are provided to prevent the escape of the valve 18 into the valve chest, should the stem 21 break or should the nut 26 be displaced.

Although I have shown an operative form of my invention, it will be recognized that many changes in the form, shape and arrangement of parts can be made without departing from the spirit of the invention, and my showing is therefore to be taken, in a sense, diagrammatic.

The use and operation of this invention are as follows:

With the parts assembled as shown, the valve will be seated and retained on its seat by the back pressure created within the valve chest 1 by the exhaust of the engine cylinder. A partial vacuum may be formed in the chest 1 under several conditions.

When the engine on which the device is mounted is itself a part of a locomotive and the throttle is closed and the locomotive is drifting or in motion, a partial vacuum may be formed in the valve chest by the movement of the pistons in the cylinder. This vacuum acting on the pressure side of the air valve causes a differential between the vacuum on the pressure side and the atmospheric pressure on the opposite side. When this occurs the valve 18 is moved into its open position and thus permits air to flow into the housing 1 and into the exhaust passages, valve chamber and cylinder.

In the conventional valve system the main valve is hollow and air which flows past the valve 18 is thus admitted to both ends of the main valve and the main cylinder and thus vacuum formation in the engine is destroyed.

The valve assembly as shown herewith is applicable to a locomotive engine or in fact to other types of steam engines, and it may be put in place without disfiguring, drilling, chipping or welding any part of the main cylinder, and hence no weakening of the cylinder or cylinders occurs when the valve is put in place.

In its use it also provides for the entrance of air in sufficient capacities to meet any vacuum condition at any speed of the engine, and thereby avoids the drawing into the valve chest and cylinders of smoke box gases with their inherent dust, grit and dirt. The elimination of cinders, grit, dirt and dust from the valve chest and associated and connected parts prevents the accumulation of such foreign matter around the exterior of tubes on the closed type feed water heaters and prevents the accumulation of a deposit of this material in the valve chest, valves and valve rings. This improves lubricating conditions within the engine and prolongs the life of all parts affected by the improvement. With the valve of this invention the locomotive engineer may freely operate the engine with the throttle in a drifting position, and no harm will develop thereafter when the throttle is closed at any speed.

I claim:

1. In combination a steam engine valve chest apertured at one end, a flanged, centrally apertured gland adapted to penetrate the aperture, with the flange overlying the chest, packing means interposed between the gland and the chest, and means for compressing the packing means to hold the gland on the chest, a sleeve having a tapered extension the inner diameter of which is less than and the outer diameter of which is greater than the diameter of the opening, a spider including radial arms, a hub, and a ring, said spider adapted to engage the end of the sleeve, means interposed between the gland and the spider for causing the spider ring to seat the tapered extension of said sleeve in the gland aperture, a valve within the sleeve adapted to seat on the inner face of the spider ring, means extending inwardly from the sleeve into the path of the valve, a valve stem integral with said valve and slidable in the hub.

2. In combination a steam engine valve chest apertured at one end, a flanged, centrally apertured gland adapted to penetrate the aperture, with the flange overlying the chest, packing means interposed between the gland and the chest, and means for compressing the packing means to hold the gland of the chest, a sleeve having a tapered extension the inner diameter of which is less than and the outer diameter of which is greater than the diameter of the opening, a spider including radial arms, a hub, and a ring, said spider adapted to engage the end of the sleeve, means interposed between the gland and the spider for causing the spider ring to seat the tapered extension of said sleeve ring to seat the tapered extension of said sleeve in the gland aperture, a valve within the sleeve adapted to seat on the inner face of the spider ring, means extending inwardly from the sleeve into the path of the valve, a valve stem integral with said valve and slidable in the hub, the valve stem being threaded and extending beyond the hub, the stem being apertured beyond the hub to permit the admission of a removable tool to hold it against rotation, and a nut threaded on the end of the stem.

3. In combination a valve chest for locomotive engines and the like apertured at one end, a relief valve assembly removably mounted in register with said aperture, including a valve and valve seat, adjustable means associated with such assembly for limiting the inward excursion of the valve, and means interposed between the valve and the interior of the valve chest for positively arresting valve movement in a direction toward the chest independent of the adjustable means, a housing on the valve assembly extending across the area of the aperture in the valve chest and outside of the valve chest and open at one side out of line with the aperture the adjustable means being located outside of the housing.

PAUL WILLIS.

REFERENCES CITED

The following references are of record in the file of this patent:

UNITED STATES PATENTS

| Number | Name | Date |
|---|---|---|
| 351,994 | Moore | Nov. 2, 1886 |
| 491,957 | Welsh | Feb. 14, 1893 |
| 1,315,727 | Howard | Sept. 9, 1919 |
| 1,400,511 | Baker | Dec. 20, 1921 |
| 1,577,473 | Latta | Mar. 23, 1926 |
| 1,693,177 | Hodgart | Nov. 27, 1928 |
| 1,885,348 | Higgins | Nov. 1, 1932 |
| 1,904,743 | Malsbary | Apr. 18, 1933 |
| 2,303,037 | Fredrickson | Nov. 24, 1942 |